March 20, 1928.
M. CONDUPA
OIL FILLER FOR AUTOMOBILES
Filed June 17, 1927
1,662,820
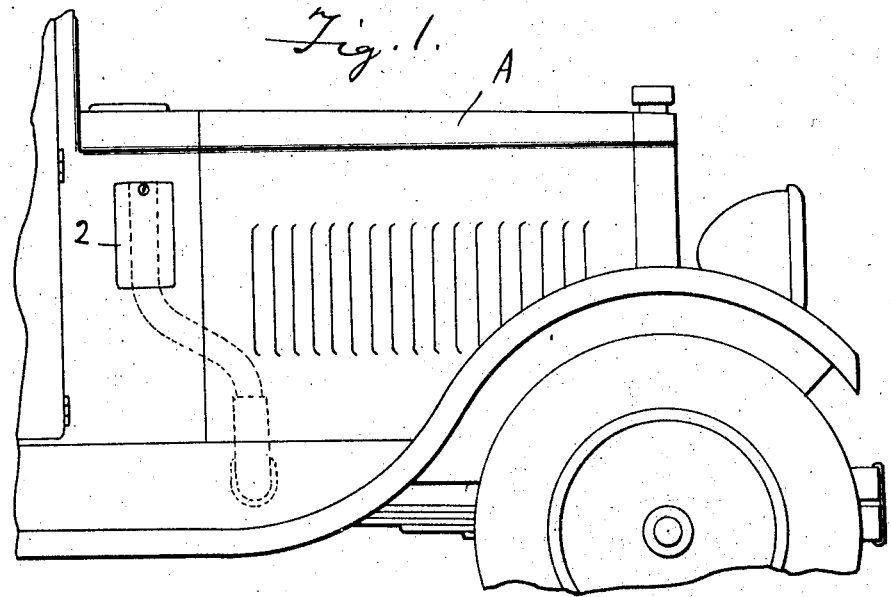
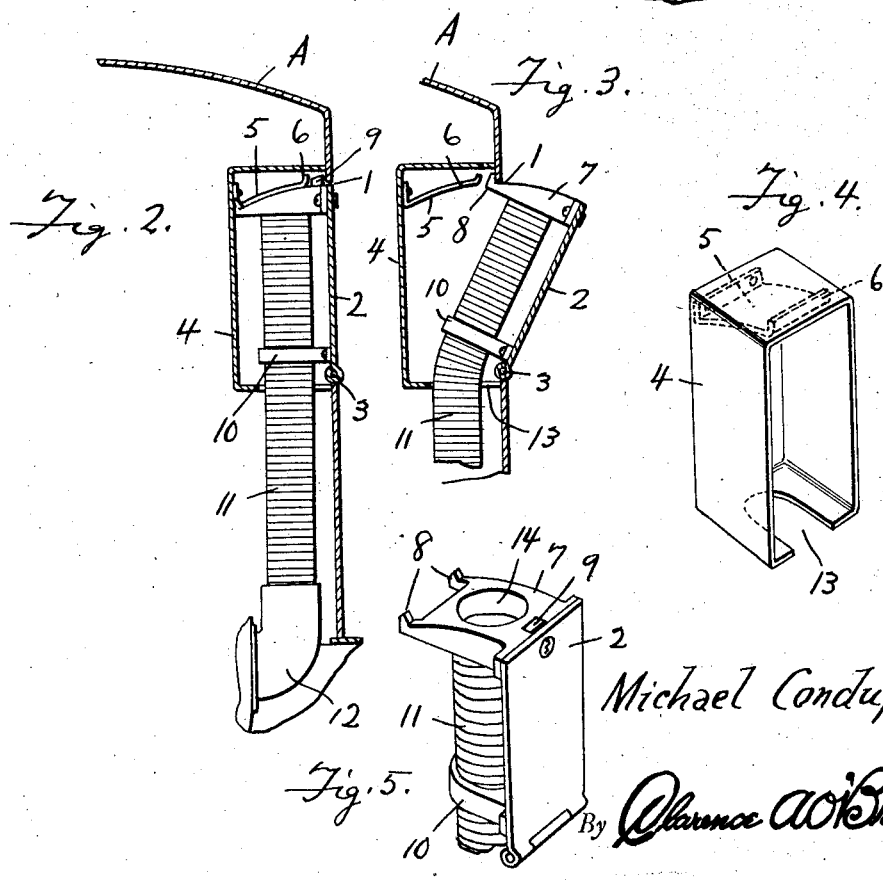
Inventor
Michael Condupa
By Clarence A. O'Brien
Attorney Patented Mar. 20, 1928.

1,662,820

UNITED STATES PATENT OFFICE.

MICHAEL CONDUPA, OF GREENSBURG, PENNSYLVANIA.

OIL FILLER FOR AUTOMOBILES.

Application filed June 17, 1927. Serial No. 199,567.

My invention relates to oil filling closures for automobiles, and the same pertains more particularly to an oil filler for crank cases, wherein the filler pipe is accessible through the side of the automobile body.

An object is to provide such a construction in association with an automobile that will be considerably convenient, as the hood of the car will not have to be raised in order to replenish the crank case with oil.

Another object is to provide a filler opening in the side of an automobile in combination with closing means which may be locked against unauthorized access to the same.

Still other objects reside in the particular manner in which the closure operates, and the simplicity of construction involved in.

In the drawing:

Figure 1 is a partial view of an automobile showing the location of the door employed in my invention for operating the oil supply pipe closure.

Fig. 2 is a fragmentary view in section through the body of an automobile showing my improved oil filling closure in closed position.

Fig. 3 is a fragmentary view of the body section, showing the oil supply pipe closure in open position.

Fig. 4 is a perspective view of the box associated with the closure of my invention, and Fig. 5 is a perspective view of the crank case portion of the oil supply pipe associated with the door.

In the drawings, like numerals designate like parts of my invention.

The letter A designates the conventional body of an automobile having an opening 1 formed in one side thereof and provided with a door 2 hingedly mounted at its lower edge at 3 to the body for closing the box 4, said box having one side thereof open and located within the body with the open side disposed over the opening in the body, the bottom wall of the box formed with a struckout opening 13 extending inwardly from the open edge of the box.

Secured to the inner side of the back wall of this box adjacent the top thereof is a spring plate 5 having the free outer edge 6 thereof bent slightly upwardly at the extent of plate, the same being substantially arcuate in cross section and slightly inclined upwardly from its point of attachment to the box.

Adjacent the upper edge at the inner side of the door, is secured a block 7 formed with a substantially curved surface, and having an opening therethrough at 14. The curved surface of the block is such as to describe an arc, the radius of which has its pivot point at the lower end of the door, the outer end of the block being bifurcated, each furcation of which being formed at its end with an upstanding foot 8. Associated with the door and block is a key actuated bolt 9 adapted to be projected upwardly in back of the upper edge of the opening in the body as clearly shown in Fig. 2 of the drawings, for locking the door against being opened by unauthorized persons.

A collar 10 is secured at the lower inner side of the door 2 and is formed with an opening therethrough. Through the opening in the collar 10 extends the flexible pipe 11 having one end thereof adapted for snug engagement within the opening of the block 7. The opposite end of the pipe is secured to a suitable construction 12 on the crank case of the automobile, with the bore of the pipe communicating with the interior of the crank case.

In operation, when it is desired to fill the crank case of the automobile by retracting the bolt 9, the door 2 may be opened. When the door is opened as shown in Fig. 3, the funnel may be placed within the opening 14 in the block and the oil forced therein to drain through the crank case. The feet members 8 abut the upper edge of the opening in the automobile body to limit the outward movement of the door.

Fig. 3 also shows that the pipe 11 will become flexed when the door 2 is in open position. When the door is to be closed, by pushing the same inwardly, the feet members 8 will engage the upwardly inclined edge 6 of the spring plate 5, and ultimately seat itself as shown in Fig. 2. At this position, by inserting a key within the lock, the bolt 9 may be projected upwardly behind the upper edge of the opening in the automobile body to lock the same against unauthorized access.

Having thus described my invention, what I claim as new is:—

1. In an oil filler closure for automobile crank cases, wherein the automobile body is formed with an opening therein, a door pivotally associated with the body and adapted to close said opening, a flexible pipe adapted to communicate at one end with the crank case, and the opposite end of said pipe in movable relation with the door.

2. In an oil filler closure for automobile crank cases wherein the automobile body is formed with an opening therein, a door pivotally associated with the body and adapted for closing said opening, a box having one side thereof open and being formed with an opening in the bottom thereof, said box adapted to be disposed within the body with its open side over the opening in the body, a flexible pipe communicating with the crank case at one end and adapted to project through the opening in the bottom of the box, the opposite end of said pipe adapted for removable relation with said door, and latch means on said box for retaining said door in a closed position.

3. In an oil filler closure for automobile crank cases wherein the automobile body is formed with an opening therein, a door pivotally associated with the body and adapted for closing said opening, a block carried by the door at the inner side thereof and formed with an opening therethrough, a box having one side thereof open and being formed with an opening in the bottom thereof, said box adapted to be disposed within the body with its open side over the opening in the body, a flexible plate communicating at one end with the crank case and adapted to project through the opening in the bottom of the box, the opposite end of said plate adapted for snug engagement within the opening in the box, and means between the box and the block for retaining the door in closed position.

4. In an oil filler closure for automobile crank cases wherein the automobile body is formed with an opening therein, a door pivotally associated with the body and adapted for closing said opening, a block carried by the door at the inner side thereof and formed with an opening therethrough, a box having one side thereof open and being formed with an opening in the bottom thereof, said box adapted to be disposed within the body with its open side over the opening in the body, a flexible plate communicating at one end with the crank case and adapted to project through the opening in the bottom of the box, the opposite end of said plate adapted for snug engagement within the opening in the box, means between the box and the block for retaining the door in closed position, said means comprising a spring plate projecting from the inner side of the box, and feet members on the block engageable with said spring plate for retaining the door in closed position.

In testimony whereof I affix my signature.

MICHAEL CONDUPA.